(12) United States Patent
Wong

(10) Patent No.: US 8,541,985 B1
(45) Date of Patent: Sep. 24, 2013

(54) MULTIFUNCTIONAL PORTABLE POWER BANK

(71) Applicant: Gigastone Corporation, Taipei (TW)

(72) Inventor: John Wong, Taipei (TW)

(73) Assignee: Gigastone America Corp CA (US)

( * ) Notice: Subject to any disclaimer, the term of this patent is extended or adjusted under 35 U.S.C. 154(b) by 0 days.

(21) Appl. No.: 13/686,513

(22) Filed: Nov. 27, 2012

(51) Int. Cl.
*H02J 7/04* (2006.01)
*H02J 7/00* (2006.01)

(52) U.S. Cl.
USPC ............ 320/140; 320/112; 320/135; 320/138

(58) Field of Classification Search
USPC .................. 320/135, 138, 112, 140
See application file for complete search history.

(56) References Cited

U.S. PATENT DOCUMENTS

| | | | | |
|---|---|---|---|---|
| 5,369,565 A | * | 11/1994 | Chen et al. | 363/146 |
| 5,652,499 A | * | 7/1997 | Morita et al. | 320/112 |
| 6,667,599 B2 | * | 12/2003 | Stone et al. | 320/112 |
| 7,443,808 B2 | * | 10/2008 | Morelli et al. | 370/254 |
| 7,626,356 B2 | * | 12/2009 | Elgie et al. | 320/107 |
| 7,728,545 B2 | * | 6/2010 | Kanouda et al. | 320/101 |
| 7,855,528 B2 | * | 12/2010 | Lee | 320/107 |
| 8,013,478 B2 | * | 9/2011 | Chen et al. | 307/155 |
| 8,080,975 B2 | * | 12/2011 | Bessa et al. | 320/114 |
| 8,234,509 B2 | * | 7/2012 | Gioscia et al. | 713/300 |
| 2008/0284371 A1 | * | 11/2008 | Hsu | 320/111 |
| 2012/0297230 A1 | * | 11/2012 | Cordes et al. | 713/340 |

* cited by examiner

*Primary Examiner* — M'Baye Diao

(57) ABSTRACT

A multifunctional portable power bank includes a main body having a circuit board and a battery arranged therein. The circuit board includes a first control unit, a second control unit connected to the first control unit, and a wireless transmission unit connected to the second control unit. The first control unit controls an input voltage of an external power supply and an output voltage of a battery power of the battery, and informs the second control unit to turn on. The second control unit enables a wireless access via the wireless transmission unit or an access via the Ethernet, and enables a router mode or a network service mode. With these arrangements, the multifunctional portable power bank not only enables data access via local or wireless networks, but also supplies electric power for charging other electronic products connected thereto.

10 Claims, 9 Drawing Sheets

MULTIFUNCTIONAL PORTABLE POWER BANK

FIELD OF THE INVENTION

The present invention relates to a portable power bank, and more particularly to a multifunctional portable power bank that is conveniently portable and enables not only data access and expansion of access device via local or wireless networks but also supply of electric power for charging other electronic devices at any time.

BACKGROUND OF THE INVENTION

A wide range of portable electronic devices currently available in the market, such as smartphones, tablet computers and the like, has been configured to support fast-response and human-centered applications. For this purpose, advanced processors and many sensing elements are employed in designing the portable electronic devices. However, since the advanced processors and sensing elements consume a high amount of power during the operation thereof, the portable electronic devices using them must be supplied with supplementary power from time to time.

Currently, storage devices are provided for data access by users. For example, the portable power bank for mobile phone, NAND Flash storage and hard disk drive all are very common storage devices. Among others, the power bank also serves as a personal wireless server and a large-capacity storage device, but it has a relatively big volume and is therefore not conveniently portable.

In recent years, due to the popularization of Universal Serial Bus (USB) interface and flash memory, USB flash disk—an alternative product having big storage capacity, excellent compatibility and good portability—has been developed to enable convenient data transmission and transfer between different computers and storage devices.

Further, a mobile hard disk drive (HDD) combining an external HDD tray with a removable HDD or a USB flash disk is developed. Data on the mobile HDD can be accessed and transmitted by connecting the mobile HDD to a USB interface. However, the above data access and transmission requires a cable.

When a user wants to copy and transfer data on the mobile HDD via a wireless network, the user must also carry about a wireless network card, a mobile storage device and a mobile power supply with him or her. Since the mobile storage device does not include any power supply unit, it has to be powered by the mobile power supply to enable normal operation thereof and is therefore not convenient for use. Moreover, while the mobile storage device provides a relatively big storage capacity, it is heavy and bulky and accordingly not suitable for carrying about with the user.

SUMMARY OF THE INVENTION

A primary object of the present invention is to provide a multifunctional portable power bank that can charge a mobile device while enabling another mobile device to access data via the Internet or other wireless manners.

Another object of the present invention is to provide a multifunctional portable power bank that can serve as a server and enable cloud access.

A further object of the present invention is to provide a multifunctional portable power bank that can serve as a router.

A still further object of the present invention is to provide a multifunctional portable power bank that includes a built-in flash memory to serve as a storage device and allows access to the flash memory via network streaming.

A still further object of the present invention is to provide a multifunctional portable power bank that allows a hard disk drive (HDD), a card reader or a pen drive to connect thereto to serve as an external expanded access device, and allows access to the external expanded access device via network streaming.

To achieve the above and other objects, the multifunctional portable power bank according to the present invention includes a main body internally defining a chamber, in which a battery is mounted; and a circuit board arranged in the chamber of the main body and connected to the battery. The circuit board includes a buck converter connected to a first connector and the battery; a booster connected to the battery and a second connector; a first control unit connected to the buck converter, the booster, a changeover switch and an LED indicator for controlling the buck converter to reduce an external power supply supplied thereto to a voltage matching that of a battery power of the battery and controlling the booster to boost the battery power supplied thereto to a preset voltage; a second control unit connected to the first control unit and a wireless transmission unit, and including a connection interface, an Ethernet interface, and a plurality of modules supporting network and file access for controlling network/cloud data transmission and access; an Ethernet connector connected to the Ethernet interface; a regulator connected to the battery and the second control unit, so that the battery power is supplied to the second control unit and the wireless transmission unit via the regulator; and a connector unit connected to the connection interface of the second control unit, a flash memory and a third connector. The connector unit includes a hub/switch and a controller; the hub/switch is connected to the controller and the third connector, and the controller is connected to the flash memory.

The main body includes an upper case and a lower case connected to each other to define the chamber therebetween. The upper case has a top wall and a plurality of sidewalls perpendicularly and downwardly extended from peripheral edges of the top wall. The top wall is provided with a push button corresponding to the changeover switch and a plurality of light-transmitting sections corresponding to the LED indicator. One of the sidewalls is provided with a plurality of through holes corresponding to the first connector, the second connector, the third connector, and the Ethernet connector, respectively.

According to the present invention, the first, second and third connectors are USB connectors, the connector unit is a USB connector unit, the hub/switch is a USB hub/switch, and the controller is a USB controller; and the connection interface is a USB connection interface.

According to the present invention, the second connector is configured for connecting to a device to be charged, so as to charge the device; and the third connector is configured for connecting to an external storage device, so that the second control unit uses the external storage device as an expanded access device.

According to the present invention, the external storage device includes, but not limited to, a hard disk drive, a card reader or a pen drive; the plurality of modules supporting network and file access include a server module, a router module, a cloud storage management module, a file system module and a secure sockets layer (SSL) module.

According to the present invention, the first control unit and the second control unit are connected to each other via a bus; and the wireless transmission unit includes an antenna.

BRIEF DESCRIPTION OF THE DRAWINGS

The structure and the technical means adopted by the present invention to achieve the above and other objects can be best understood by referring to the following detailed description of the preferred embodiment and the accompanying drawings, wherein.

DETAILED DESCRIPTION OF THE PREFERRED EMBODIMENTS

The present invention will now be described with a preferred embodiment thereof and with reference to the accompanying drawings.

Figure 1:
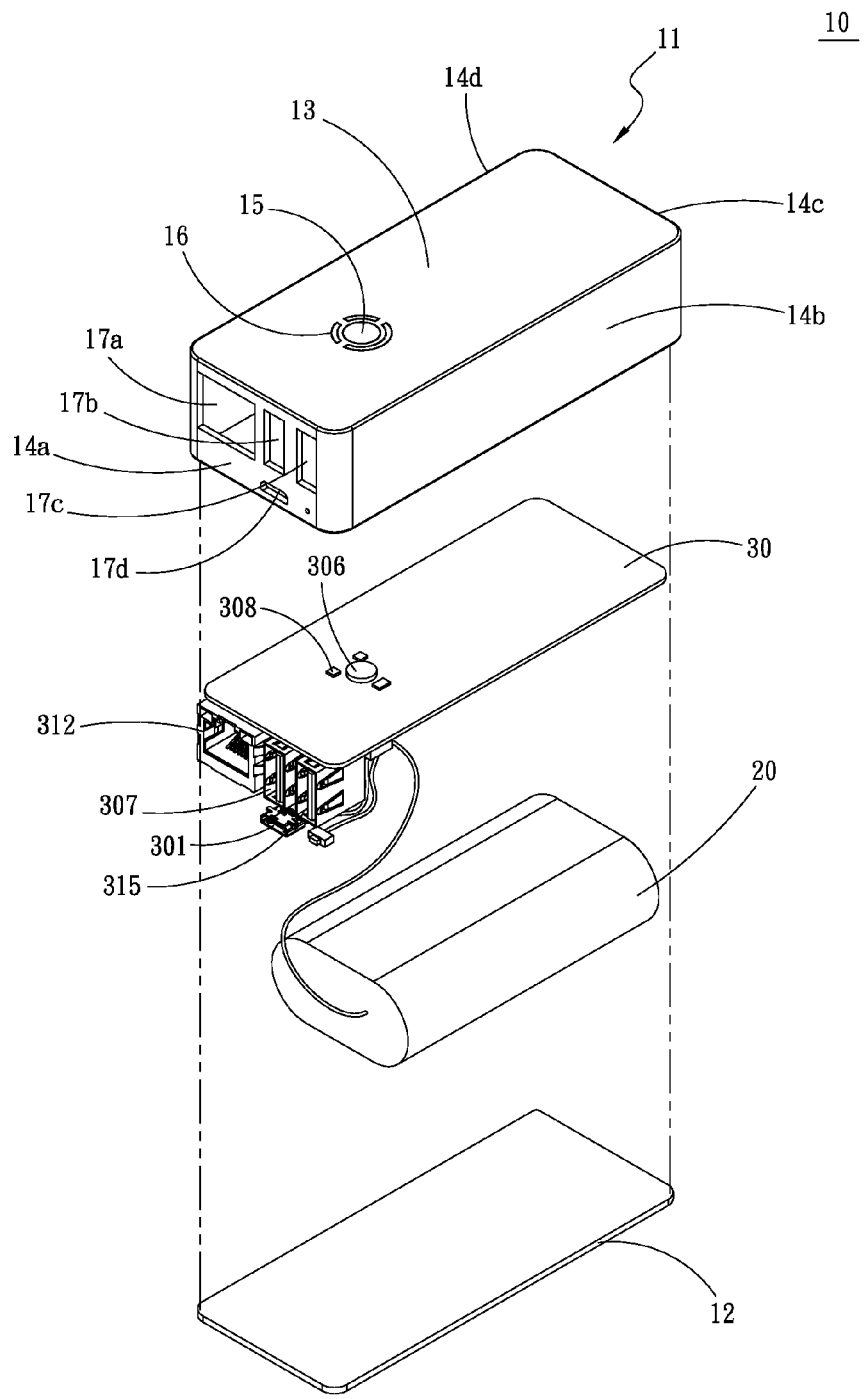
FIG. 1 is an exploded perspective view of a multifunctional portable power bank according to a preferred embodiment of the present invention.
Figure 2:
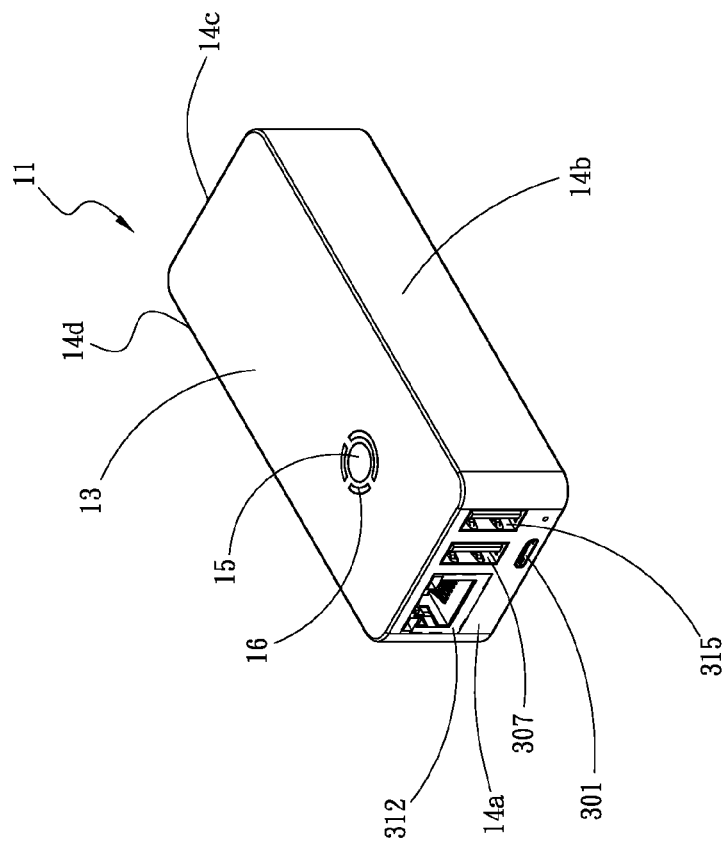
FIG. 2 is an assembled view of FIG. 1.
Figure 3:
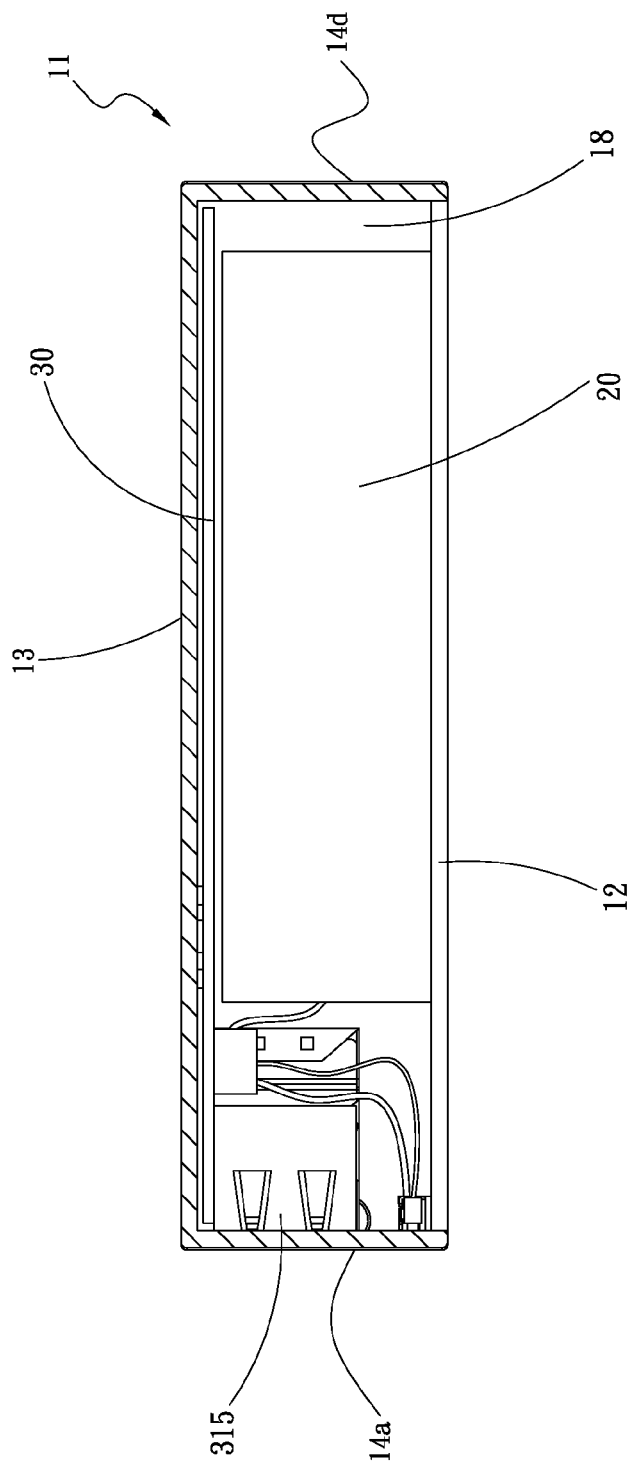
FIG. 3 is a sectional side view of FIG. 2.

Please refer to FIGS. 1, 2 and 3, in which a multifunctional portable power bank according to a preferred embodiment of the present invention is shown. As shown, the multifunctional portable power bank of the present invention includes a main body 10 including an upper case 11 and a lower case 12 connected to each other to define a chamber 18 between them, and a battery 20 and a circuit board 30 arranged in the chamber 18.

The battery 20 receives an external power supply ($V_{out}$) for storing electric power therein, and the stored electric power can be output as a battery power ($V_{bat}$). The output battery power can be, but not limited to, a direct current of 3.6V~5V. The battery 20 can be, but not limited to, a lithium-ion battery, a lithium iron phosphate (LFP) battery, a lead-acid battery, or a lithium manganese battery.

Figure 4A:
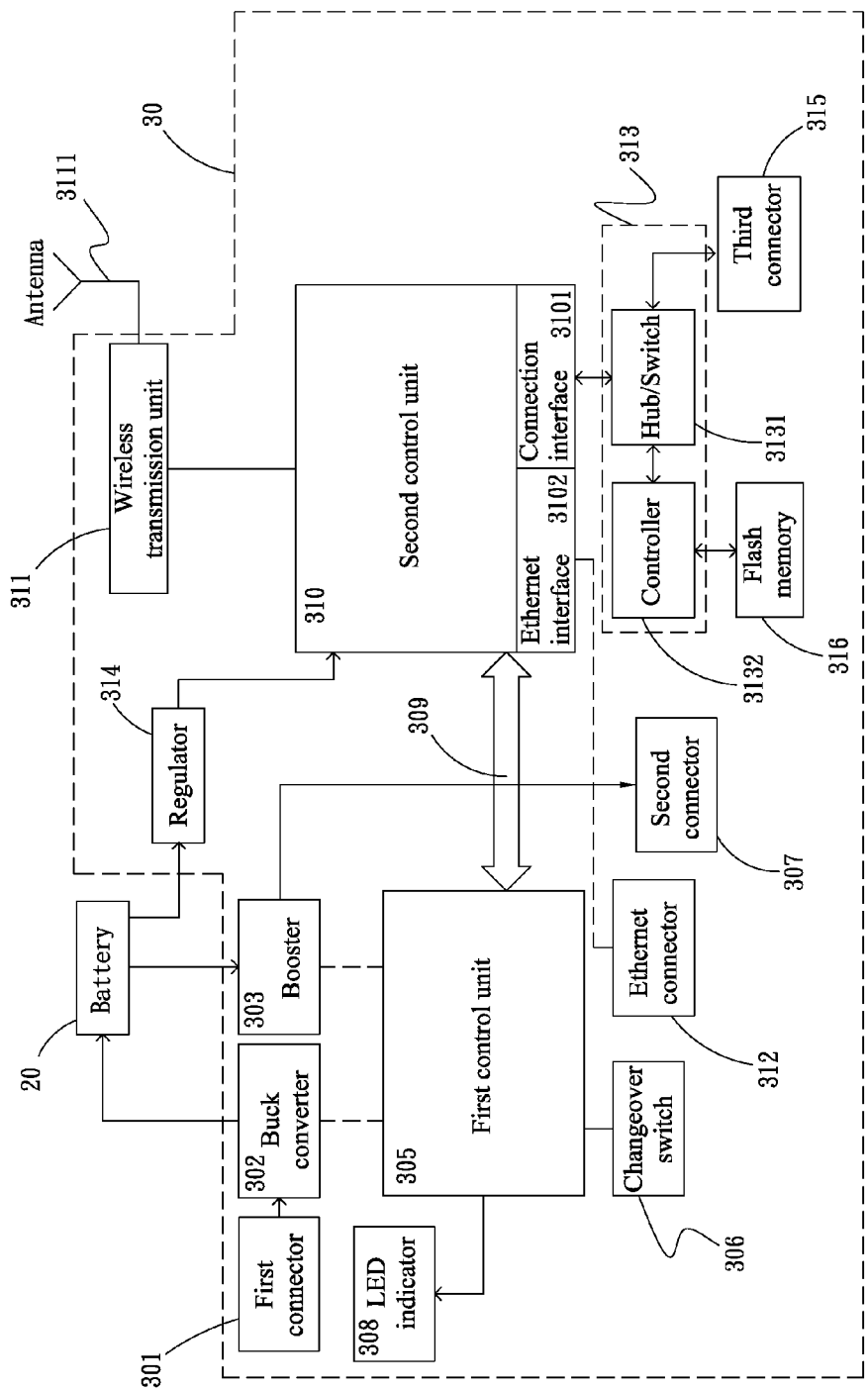
FIG. 4A is a block diagram of a circuit board for the multifunctional portable power bank according to the preferred embodiment of the present invention.

Please refer to FIG. 4A. The circuit board 30 includes a buck converter 302 connected to a first connector 301 and the battery 20; a booster 303 connected to the battery 20 and a second connector 307; a first control unit 305 connected to the buck converter 302, the booster 303, a changeover switch 306, and a light-emitting-diode (LED) indicator 308. When the external power supply ($V_{out}$) is supplied via the first connector 301 to the buck converter 302, the first control unit 305 controls the buck converter 302 to reduce the external power supply to a voltage matching that of the battery power of the battery 20. When the battery 20 is fully charged, the first control unit 305 stops the external power supply ($V_{out}$) from charging the battery 20 any further to protect the battery 20 against overcharging. The first control unit 305 also prevents the battery power of the battery 20 from being overly output to a device being charged. Further, when the battery power ($V_{bat}$) of the battery 20 is output via the booster 303 to the second connector 307, the first control unit 305 controls the booster 303 to boost the battery power ($V_{bat}$) to a preset voltage.

A second control unit 310 is connected to the first control unit 305 via a bus 309. A wireless transmission unit 311 is connected to the second control unit 310 and includes an antenna 3111. The second control unit 310 includes a connection interface 3101, an Ethernet interface 3102, and a plurality of modules supporting network and file access (shown in FIG. 5) for controlling network/cloud data transmission and access. An Ethernet connector 312 is connected to the Ethernet interface 3102.

A regulator 314 is connected to the battery 20 and the second control unit 310. The battery power ($V_{bat}$) is supplied via and regulated by the regulator 314 to form a battery power with a stable voltage for supplying to the second control unit 310 and the wireless transmission unit 311.

A connector unit 313 is connected to the connection interface 3101 of the second control unit 310, and includes a hub/switch 3131 and a controller 3132. The hub/switch 3131 is connected to the controller 3132 and the connection interface 3101. In the preferred embodiment of the present invention, the connector unit 313 is preferably a USB connector unit, the hub/switch 3131 is preferably a USB hub/switch, and the controller 3132 is preferably a USB controller; and the connection interface 3101 is preferably a USB connection interface.

A flash memory 316 is connected to the controller 3132. The controller 3132 operates based on data input to the flash memory 316 and generates an error detection code (EDC) or an error correction code (ECC). A third connector 315 is connected to the hub/switch 3131.

Figure 4B:
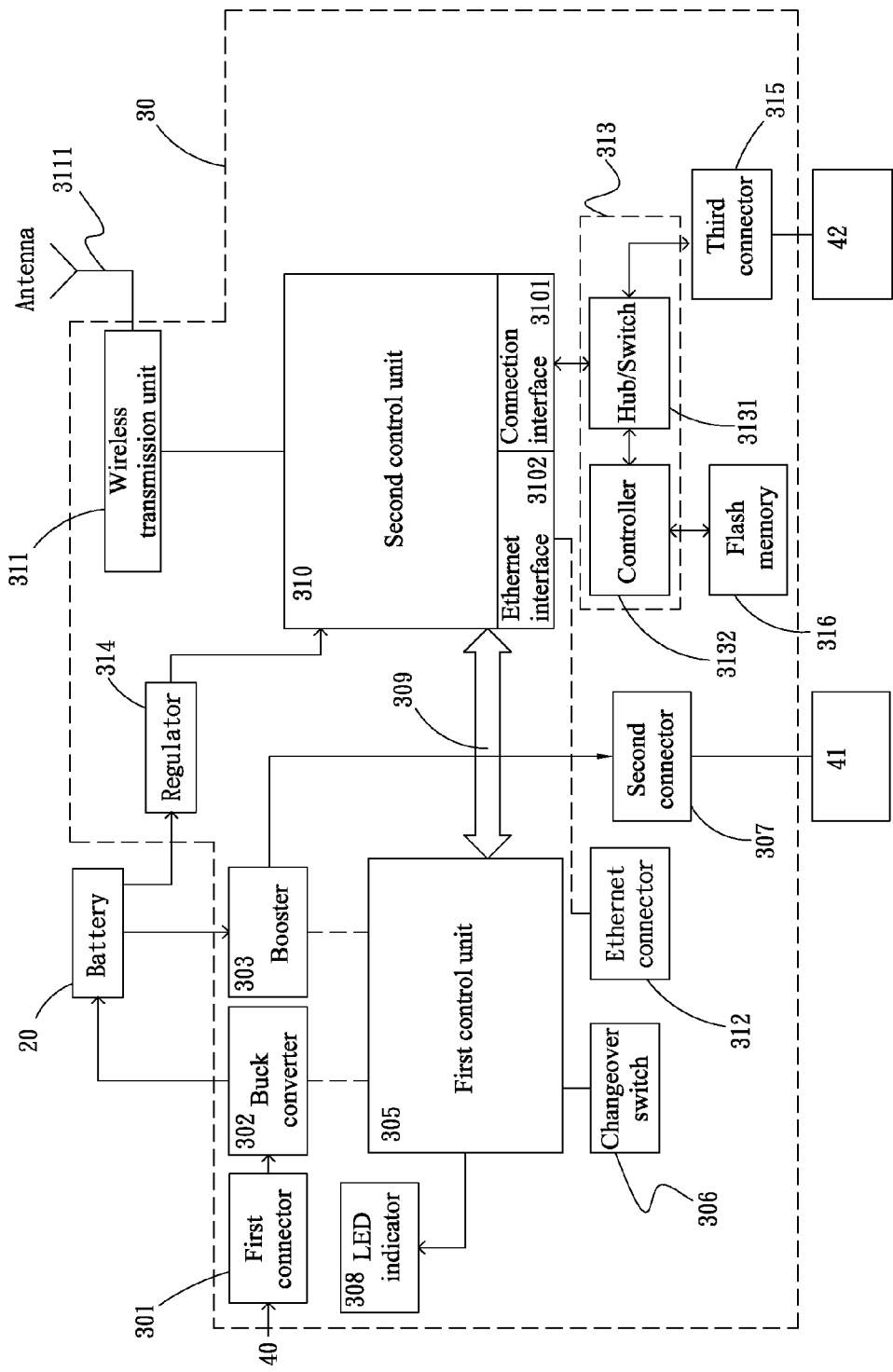
FIG. 4B is a block diagram showing the connection of the present invention to an external power supply, a device to be charged, and an external storage device.

The first connector 301 can be, but not limited to, a mini USB connector; and the second and the third connector 307, 315 can respectively be, but not limited to, a USB connector, as shown in FIGS. 1 and 2. Herein, the USB referred to generally includes USB1.0, USB2.0 and USB3.0. As shown in FIG. 4B, the first connector 301 in the preferred embodiment can be connected to an external power supply 40 for charging the battery 20; the second connector 307 can be connected to a device to be charged 41, such as a smartphone or other tablet computer, and the third connector 315 can be connected to an external storage device 42. When the device to be charged 41 is connected to the second connector 307 and charged by the battery power of the battery 20, the first control unit 305 detects whether the device 41 has been fully charged. If yes, the first control unit 305 would stop the battery 20 from charging the device 41 any further. When the external storage device 42 is connected to the third connector 315, the second control unit 310 detects the existence of the external storage device 42 and uses the latter as an expanded access device. The external storage device 42 includes, but not limited to, a hard disk drive (HDD), a card reader, or a pen drive.

Figure 5:
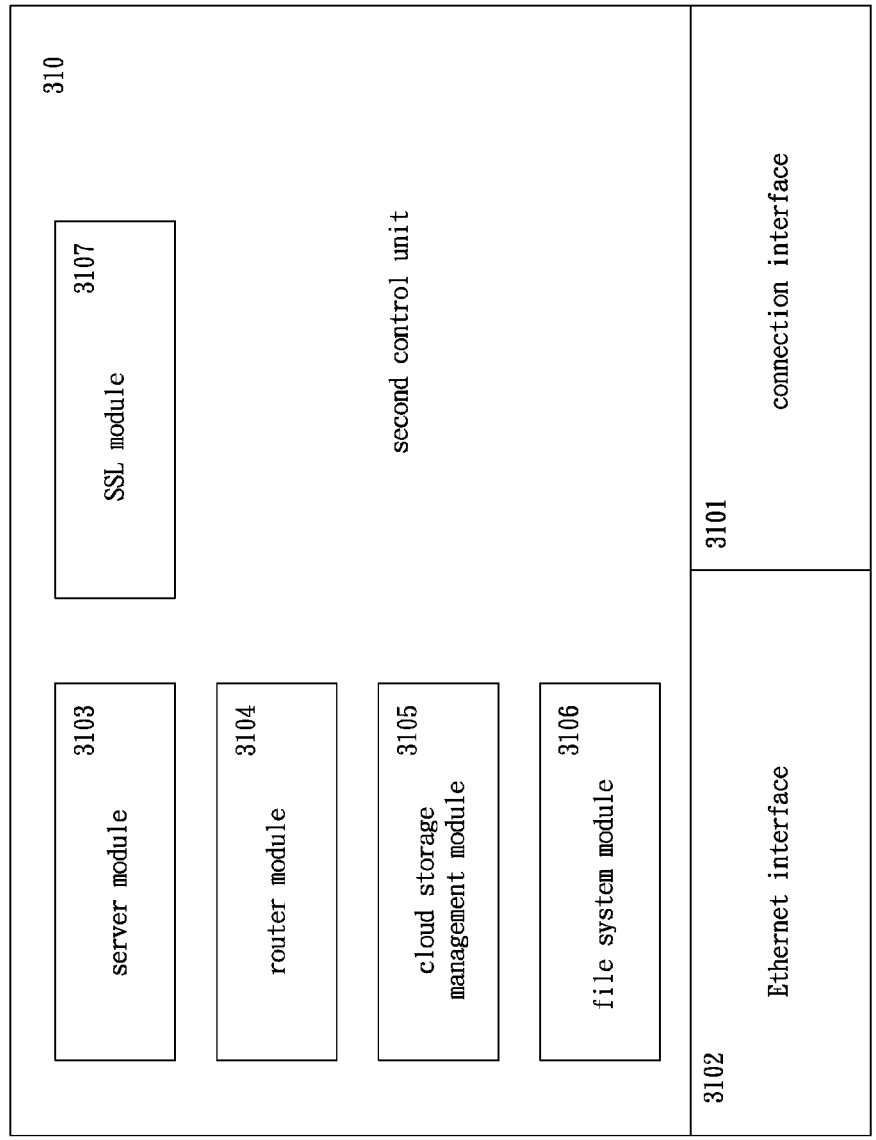
FIG. 5 is a block diagram of a second control unit for the multifunctional portable power bank according to the preferred embodiment of the present invention.

FIG. 5 is a block diagram of the second control unit 310 showing the plurality of modules therein for supporting network and file access includes a server module 3103, a router module 3104, a cloud storage management module 3105, a file system module 3106, and an SSL (Secure Sockets Layer) module 3107. The server module 3103 includes a Web server and an FTP (File Transfer Protocol) server, an HTTP (Hypertext Transfer Protocol) server, or an SFTP (Secure Shell File Transfer Protocol) server. With the server module 3013, the multifunctional portable power bank of the present invention can serve as a server. When a client is connected to the portable power bank of the present invention in a wired or a wireless manner, contents on the server, i.e. the portable power bank, can be browsed or accessed via a browser or an APP (application) on the client. The contents on the server can include text data, graphic data and multimedia data stored in the flash memory 316 or stored in the external storage device 42, as shown in FIG. 4B. With the router module 3104, the multifunctional portable power bank of the present invention can be connected to devices over more than two separate networks. The cloud storage management module 3105 supports a client to upload the client's data via the Internet for storing the data in the flash memory 316 of the multifunctional portable power bank or the external storage device 42, as shown in FIG. 4B. The file system module 3106 manages data in the flash memory 316 and data in the external storage device 42, as shown in FIG. 4B. The SSL module 3107 provides transmission security over the Internet to ensure confidentiality and integrity of communication and authenticates a server's identity.

Figure 6:
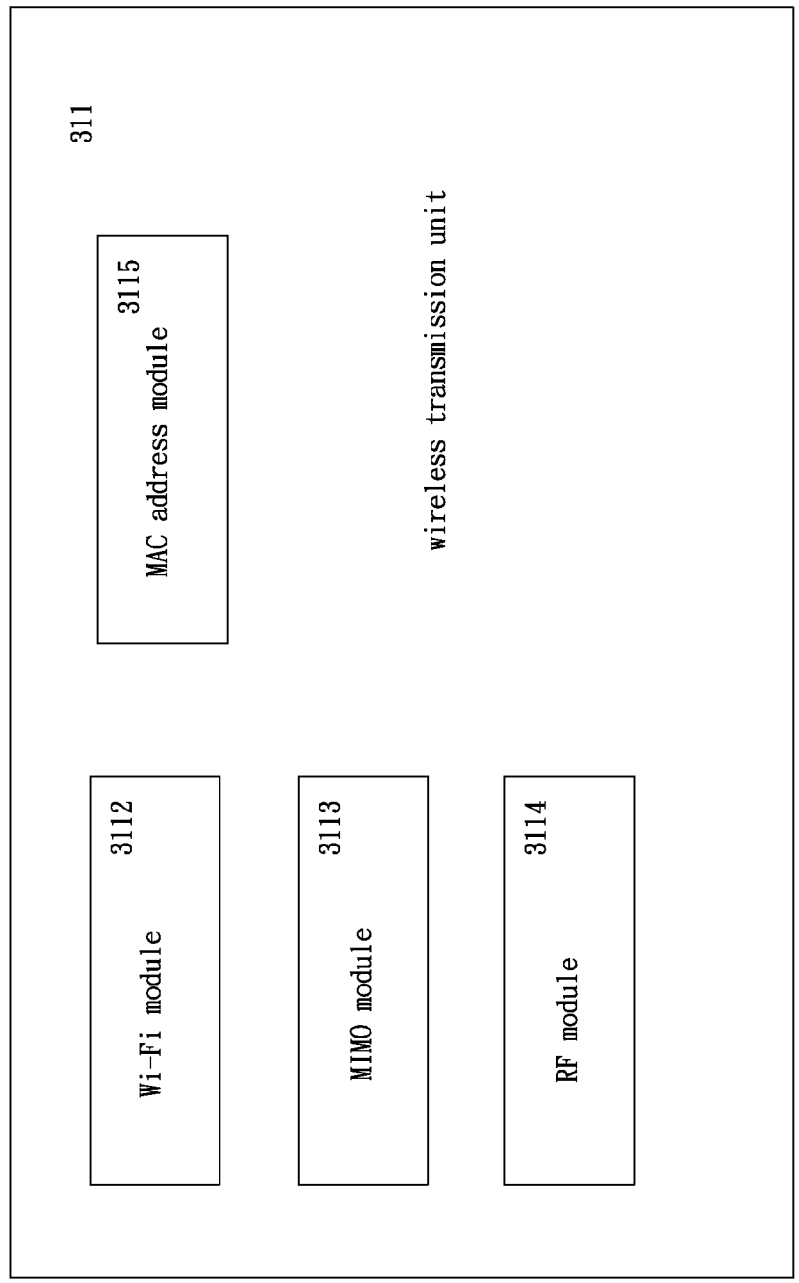
FIG. 6 is a block diagram of a wireless transmission unit for the multifunctional portable power bank according to the preferred embodiment of the present invention.

FIG. 6 is a block diagram of the wireless transmission unit 311. As shown, the wireless transmission unit 311 includes a Wi-Fi module 3112, a multi-input multi-output (MIMO) module 3113, and a radio frequency (RF) module 3114. With these modules 3112, 3113, 3114, the multifunctional portable power bank of the present invention supports wireless transmission protocols and upgrades the quality of wireless transmission. The wireless transmission unit 311 further includes a media access control (MAC) address module 3115 for filtering clients based on their MAC addresses, so as to admit or deny the connection of clients to the wireless network. In this manner, it is able to effectively control the wireless clients' access right.

Please refer to FIGS. 1 to 3 again. The upper case 11 includes a top wall 13 and a plurality of sidewalls 14a~14d perpendicularly downwardly extended from peripheral edges of the top wall 13. The top wall 13 is provided with a push button 15 corresponding to the changeover switch 306, and a plurality of light-transmitting sections 16 corresponding to the LED indicator 308. One of the sidewalls 14a~14d, such as the sidewall 14a, is provided with a plurality of through holes 17a~17d corresponding to the first connector 301, the second connector 307, the third connector 315 and the Ethernet connector 312, respectively.

The applications of the multifunctional portable power bank of the present invention in remote connection and local connection are now explained with two examples as below.

Remote Connection

Figure 7:
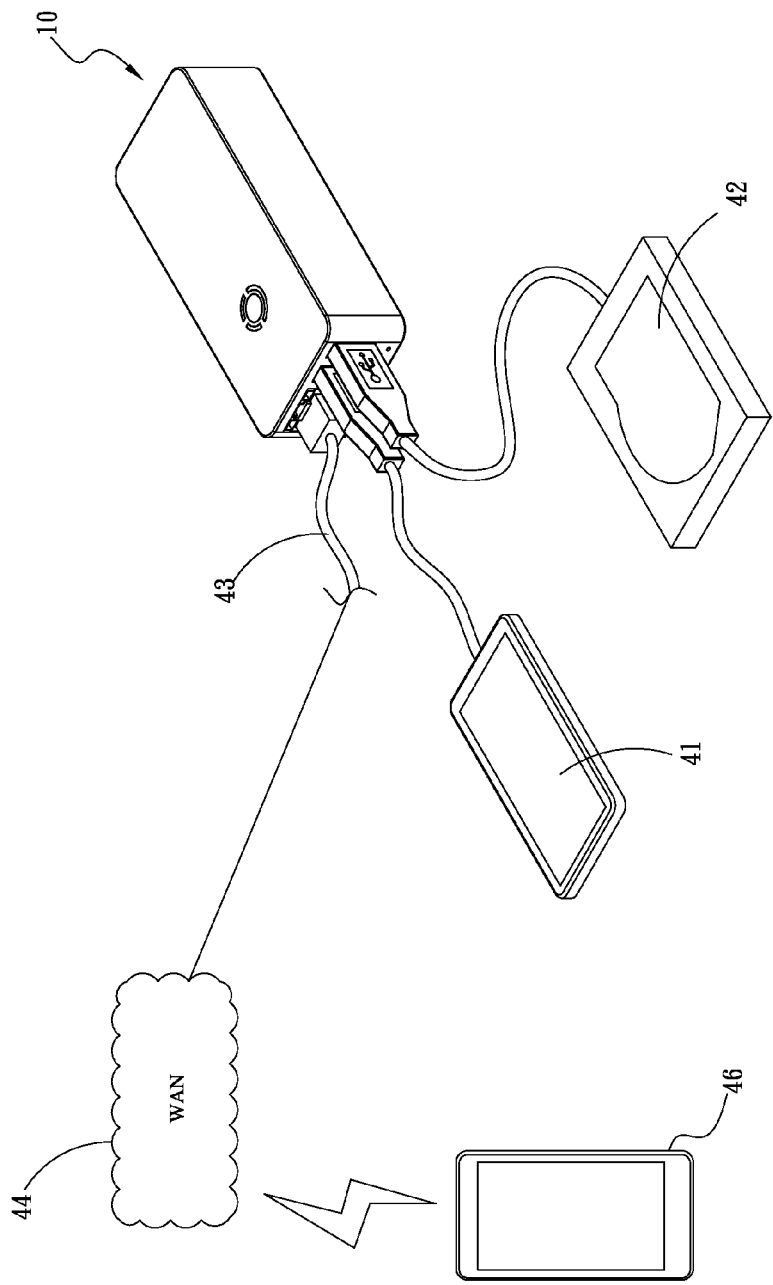
FIG. 7 is a conceptual view showing the application of the present invention to remote connection.

Please refer to FIG. 7 along with FIGS. 4A, 4B and 5. The multifunctional portable power bank of the present invention can be connected to a Wide Area Network (WAN) 44 by connecting an Ethernet cable 43 to the Ethernet connector 312; to a device to be charged 41, such as a smartphone, by connecting a transmission cable to the second connector 307; and to an external storage device 42, such as a portable external hard disk drive, by connecting a transmission cable to the third connector 315. When the changeover switch 306 is turned on, the battery power of the battery 20 is supplied to the first control unit 305, the second control unit 310, the wireless transmission unit 311 and the LED indicator 308 for them to work. The first control unit 305 controls the battery power of the battery 20 to charge the device to be charged 41 via the second connector 307 while detects whether the device 41 has been fully charged. When it is detected the device 41 has been fully charged, the first control unit 305 controls the battery 20 to stop charging the device 41. Meanwhile, via the bus 309, the first control unit 305 informs the second control unit 310 to actuate the router module 3104 in the second control unit 310. Another mobile device 46 at a remote location can be connected to the multifunctional portable power bank of the present invention by connecting to the WAN via a wireless hotspot. And, through linking of a browser or a suitable APP in the mobile device 46 to the server module 3103 and the cloud storage management module 3105 in the second control unit 310, the remote mobile device 46 can browse or access the contents in the flash memory 316 and the external storage device 42.

Local Connection

Figure 8:
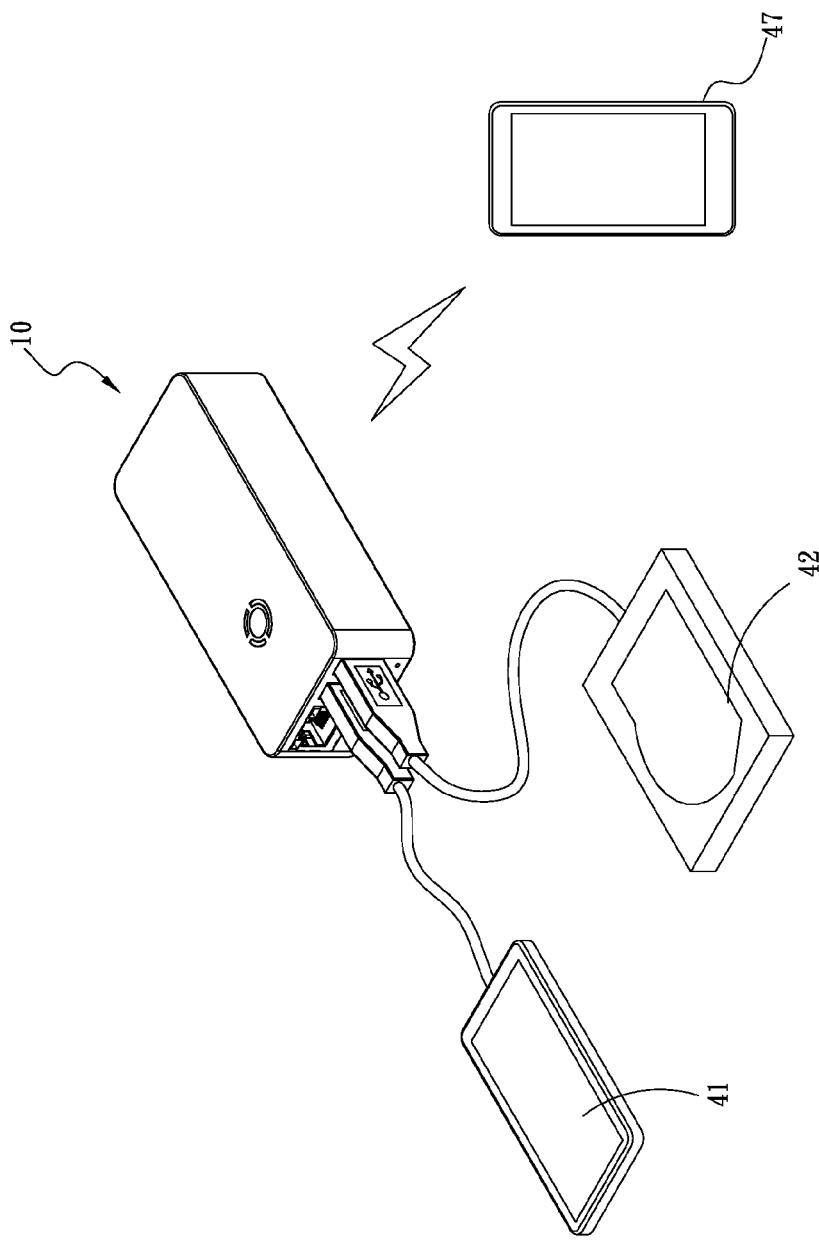
FIG. 8 is a conceptual view showing the application of the present invention to local connection.

Please refer to FIG. 8 along with FIGS. 4A, 4B and 5. A device to be charged 41, such as a smartphone, can be connected via a transmission cable to the second connector 307. An external storage device 42, such as a portable external hard disk drive, can be connected via a transmission cable to the third connector 315. When the changeover switch 306 is turned on, the battery power of the battery 20 is supplied to the first control unit 305, the second control unit 310, the wireless transmission unit 311 and the LED indicator 308 for them to work. The first control unit 305 controls the battery power of the battery 20 to charge the device to be charged 41 via the second connector 307 while detects whether the device 41 has been fully charged. When it is detected the device 41 has been fully charged, the first control unit 305 controls the battery 20 to stop charging the device 41. Meanwhile, via the bus 309, the first control unit 305 informs the second control unit 310 to actuate the router module 3104 in the second control unit 310. The second control unit 310 also enables the Wi-Fi module 3112 and/or the MIMO module 3113 and/or the RF module 3114 and/or the MAC address module 3115 in the wireless transmission unit 311. Another mobile device 47 within a local area can be wirelessly connected to the wireless transmission unit 311 via a wireless signal, such as a Wi-Fi signal, transmitted by the mobile device 47 and received by the antenna 3111. And, through linking of a browser or a suitable APP in the mobile device 47 to the server module 3103 and the cloud storage management module 3105 in the second control unit 310, the remote mobile device 47 can browse or access the contents in the flash memory 316 and the external storage device 42.

The present invention has been described with a preferred embodiment thereof and it is understood that many changes and modifications in the described embodiment can be carried out without departing from the scope and the spirit of the invention that is intended to be limited only by the appended claims.

What is claimed is:

1. A multifunctional portable power bank, comprising:
    a main body internally defining a chamber, in which a battery is mounted; and
    a circuit board being arranged in the chamber of the main body and connected to the battery; the circuit board including:
        a buck converter connected to a first connector and the battery;
        a booster connected to the battery and a second connector;
        a first control unit connected to the buck converter, the booster, a changeover switch, and an LED indicator; the first control unit controlling the buck converter to reduce an external power supply supplied thereto to a voltage matching that of a battery power of the battery; and controlling the booster to boost the battery power supplied thereto to a preset voltage;
        a second control unit connected to the first control unit and a wireless transmission unit; and the second control unit including a connection interface, an Ethernet interface, and a plurality of modules supporting network and file access for controlling network/cloud data transmission and access;

an Ethernet connector connected to the Ethernet interface;

a regulator connected to the battery and the second control unit; and the battery power being supplied to the second control unit and the wireless transmission unit via the regulator; and a connector unit connected to the connection interface of the second control unit, a flash memory and a third connector; the connector unit including a hub/switch and a controller; the hub/switch being connected to the controller and the third connector, and the controller being connected to the flash memory.

2. The multifunctional portable power bank as claimed in claim 1, wherein the main body includes an upper case and a lower case connected to each other to define the chamber therebetween; the upper case having a top wall and a plurality of sidewalls perpendicularly and downwardly extended from peripheral edges of the top wall; the top wall being provided with a push button corresponding to the changeover switch and a plurality of light-transmitting sections corresponding to the LED indicator; and one of the sidewalls being provided with a plurality of through holes corresponding to the first connector, the second connector, the third connector, and the Ethernet connector, respectively.

3. The multifunctional portable power bank as claimed in claim 1, wherein the first, second and third connectors are respectively a USB connector.

4. The multifunctional portable power bank as claimed in claim 1, wherein the connector unit is a USB connector unit, the hub/switch is a USB hub/switch, and the controller is a USB controller, and the connection interface is a USB connection interface.

5. The multifunctional portable power bank as claimed in claim 1, wherein the second connector is configured for connecting to a device to be charged.

6. The multifunctional portable power bank as claimed in claim 1, wherein the third connector is configured for connecting to an external storage device, and the second control unit using the external storage device as an expanded access device.

7. The multifunctional portable power bank as claimed in claim 6, wherein the external storage device is selected from the group consisting of a hard disk drive (HDD), a card reader, and a pen drive.

8. The multifunctional portable power bank as claimed in claim 1, wherein the plurality of modules supporting network and file access includes a server module, a router module, a cloud storage management module, a file system module, and an SSL (Secure Sockets Layer) module.

9. The multifunctional portable power bank as claimed in claim 1, wherein the first control unit and the second control unit are connected to each other via a bus.

10. The multifunctional portable power bank as claimed in claim 1, wherein the wireless transmission unit includes an antenna.

* * * * *